United States Patent
Tanaka

(10) Patent No.: US 11,590,935 B2
(45) Date of Patent: Feb. 28, 2023

(54) WIPER DEVICE

(71) Applicant: DENSO CORPORATION, Kariya (JP)

(72) Inventor: Shinnosuke Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 254 days.

(21) Appl. No.: 16/854,409

(22) Filed: Apr. 21, 2020

(65) Prior Publication Data

US 2020/0339069 A1 Oct. 29, 2020

(30) Foreign Application Priority Data

Apr. 26, 2019 (JP) .............................. JP2019-085943

(51) Int. Cl.
*B60S 1/34* (2006.01)

(52) U.S. Cl.
CPC .............. *B60S 1/3472* (2013.01); *B60S 1/34* (2013.01); *B60S 1/3411* (2013.01)

(58) Field of Classification Search
CPC .......... B60S 1/3411; B60S 1/34; B60S 1/347; B60S 1/3465; B60S 1/3472; B60S 1/3413; B60S 1/3443
USPC ........................ 15/250.202, 250.203, 250.21
See application file for complete search history.

(56) References Cited

U.S. PATENT DOCUMENTS

| | | | | |
|---|---|---|---|---|
| 4,439,886 A | * | 4/1984 | Yagasaki | B60S 1/3411 15/250.16 |
| 4,472,854 A | * | 9/1984 | Bauer | B60S 1/3411 15/250.34 |
| 5,289,607 A | * | 3/1994 | Journee | B60S 1/3411 15/250.352 |
| 5,339,489 A | * | 8/1994 | Journee | B60S 1/3411 15/250.352 |
| 5,421,055 A | * | 6/1995 | Harmon | B60S 1/3411 192/84.1 |

FOREIGN PATENT DOCUMENTS

| | | | |
|---|---|---|---|
| EP | 0522338 | * | 1/1993 |
| EP | 0539248 | * | 4/1993 |
| JP | S59-145647 A | | 8/1984 |
| JP | S61-125952 A | | 6/1986 |
| JP | S61-125954 A | | 6/1986 |

OTHER PUBLICATIONS

Machine translation of description portion of EP publication 0539248 published Apr. 1993. (Year: 1993).*

* cited by examiner

*Primary Examiner* — Gary K. Graham

(74) *Attorney, Agent, or Firm* — Oliff PLC

(57) ABSTRACT

A wiper device includes a wiper arm and a drive section. The wiper arm has a base end portion supported by a support section provided at a vehicle, and is configured such that a wiping surface of the vehicle is wiped back and forth by a wiper blade coupled to a leading end portion of the wiper arm. The drive section is configured to displace at least a leading end portion side of the wiper arm in an up-and-down direction with respect to the wiping surface during back and forth movement of the wiper arm, irrespective of force the wiper blade receives from the wiping surface.

13 Claims, 10 Drawing Sheets

WIPER DEVICE

CROSS-REFERENCE TO RELATED APPLICATION

This application is based on and claims priority under 35 USC 119 from Japanese Patent Application No. 2019-085943 filed on Apr. 26, 2019, the disclosure of which is incorporated by reference herein.

BACKGROUND

Technical Field

The present disclosure relates to a wiper device for a vehicle.

Related Art

Hitherto, vehicle wiper devices exist that include a wiper arm configured to swing back and forth about a pivot shaft supported by a vehicle, and a wiper blade coupled to a leading end portion of the wiper arm and configured to wipe a glass surface of the vehicle. Such a wiper arm includes, for example, an arm head fixed to the pivot shaft and a retainer coupled to the arm head so as to be capable of pivoting about a hinge shaft. A coil spring (generally, a tension spring) is stretched between the arm head and the retainer, such that the coil spring extends and contracts in response to the pivoting of the retainer with respect to the arm head. For a glass surface of the vehicle having a large curvature along the vehicle width direction or along the vehicle front-rear direction, the coil spring is stretched such that, through the wiper arm, the wiper blade follows the glass surface and is constantly pressed against the glass surface. The coil spring extends and contracts in response to a pressing location (wiping position) of the wiper blade on the glass surface, and the orientation of the retainer is changed thereby. When the vehicle is traveling at high speed, lift that attempts to lift up the wiper arm arises due the effect of travel-induced airflow.

In a wiper device with the above configuration, tension of the coil spring is set such that the wiper blade follows and is pressed against the glass surface even at a location where the glass surface is lowest in an axial direction of the pivot shaft (namely, a rotation position of the wiper arm where the coil spring is at its shortest in cases in which the coil spring is configured by a tension spring). As a result, a larger than necessary (excessive) load is applied to the wiper arm and the wiper blade due to stretching of the coil spring at a location where the glass surface is at its highest in the axial direction. Regarding settings for the coil spring, the tension applied thereto considers an anticipated resistance component to travel-induced airflow during high speed travel, so as to enable good wiping to be obtained even when the vehicle is traveling at high speed, and such that the wiper blade does not lift up due to lift of the travel-induced airflow. This leads to an unnecessarily strong load being applied to the wiper arm and the wiper blade during normal travel. Wiper devices have been proposed in which the tension of a coil spring is adjusted to reduce such unnecessary loads (see, for example, Japanese Patent Application Laid-Open (JP-A) Nos. S59-145647, S61-125952, and S61-125954).

In the wiper device described in JP-A No. S59-145647, a first cog rotatably fitted onto a pivot, acting as a bearing for a pivot shaft, is fixable by a fixing member. A second cog coaxial to a worm gear pivoted from an arm head is meshed with the first cog, one end of a coil spring is anchored to a worm wheel meshing with the worm gear at a position away from a rotation shaft of the worm wheel, and the tension of the coil spring is adjusted by the state in which the first cog is fixed.

In the automobile wiper devices described in JP-A Nos. S61-125952 and S61-125954, an air cylinder parallel to a coil spring is interposed between a retainer and an arm head. A large diameter hole and an orifice are provided in a piston head of the air cylinder to place two chambers partitioned by the piston head in communication with each other. Moreover, a one-way valve is mounted to the piston head to open and close the large diameter hole. The one-way valve is set so as to open when the air cylinder is retracted. This enables the spring load applied to the wiper blade to be adjusted.

SUMMARY

However, in the related technology described in the above publications, spring load of the spring stretched to the wiper arm both causes the wiper arm to follow changes in the glass surface, and causes the wiper blade to contact the glass surface with an appropriate contact pressure. Thus the spring load imparted needs to consider the following action of the wiper arm, when affected by changes in the profile of the glass surface (wiping surface), momentary changes to the travel-induced airflow, and the like. The contact pressure of the wiper blade contacting the glass surface is thus readily affected by external factors, making a stable appropriate contact pressure against the glass surface difficult to achieve.

In consideration of the above circumstances, an object of the present disclosure is to provide a wiper device that enables independent setting to cause a wiper arm to follow changes in the profile of a wiping surface, and setting to press a wiper blade against the wiping surface with an appropriate contact pressure.

A wiper device of a first aspect of the present disclosure includes a wiper arm and a drive section. The wiper arm has a base end portion supported by a support section provided at a vehicle, and is configured such that a wiping surface of the vehicle is wiped back and forth by a wiper blade coupled to a leading end portion of the wiper arm. The drive section is configured to displace at least a leading end portion side of the wiper arm in an up-and-down direction with respect to the wiping surface during back and forth movement of the wiper arm, irrespective of force the wiper blade receives from the wiping surface.

According to the wiper device of the first aspect, the wiper arm has a base end portion supported by the support section provided at the vehicle and is moved back and forth. The wiper blade coupled to the leading end portion of the wiper arm thereby wipes the wiping surface of the vehicle back and forth. Moreover, during back and forth movement of the wiper arm, the drive section displace at least the leading end portion side of the wiper arm in the up-and-down direction with respect to the wiping surface irrespective of force the wiper blade receives from the wiping surface. This enables at least the leading end portion side to be caused to follow the wiping surface irrespective of changes in the profile of the wiping surface and external factors such as travel-induced airflow. Moreover, due to being able to cause the orientation of at least the leading end portion side (hereafter referred to as "wiper arm orientation") to always follow changes in the profile of the wiping surface, the contact pressure against the wiping surface of the wiper blade coupled to the leading end portion of the wiper arm can be set independently of the ability of the wiper arm orientation to follow the wiping surface. As a result, an appropriate contact pressure can be stably imparted to the wiping surface without, for example, imparting an unnecessary large spring load.

A wiper device of a second aspect of the present disclosure is the first aspect, further including an urging section configured to urge the wiper blade toward the wiping surface.

During back and forth movement of the wiper arm in the wiper device of the second aspect, in a configuration in which the drive section displaces at least the leading end portion side of the wiper arm in the up-and-down direction with respect to the wiping surface, the wiper blade is urged toward the wiping surface by the urging section. This enables the wiper blade to be contacted against the wiping surface with a uniform and comparatively small urging force independently of the ability of the wiper arm orientation to follow the wiping surface.

A wiper device of a third aspect of the present disclosure is the first aspect, wherein the drive section includes an actuator configured to displace at least the leading end portion side in the up-and-down direction with respect to the wiping surface, and a control section configured to control actuation of the actuator so as to maintain a uniform distance between the leading end portion and the wiping surface during back and forth movement of the wiper arm.

According to the wiper device of the third aspect, during back and forth movement of the wiper arm, the control section controls actuation of the actuator, and the actuator displaces at least the leading end portion side of the wiper arm in the up-and-down direction with respect to the wiping surface. A uniform distance is thereby maintained between the leading end portion of the wiper arm and the wiping surface. Due to adopting such a configuration in which the actuation of the actuator is controlled to maintain a uniform distance between the leading end portion of the wiper arm and the wiping surface, the wiper arm following is configured so as to be responsive to circumstances by inputting control signals, thus enabling an even more stable and appropriate contact pressure to be achieved for the contact pressure of the wiper blade.

A wiper device of a fourth aspect of the present disclosure is the third aspect, wherein the actuator is a support drive actuator configured to displace the support section itself relative to the vehicle.

According to the wiper device of the fourth aspect, during back and forth movement of the wiper arm, the support drive actuator displaces the support section itself relative to the vehicle, displacing the entire wiper arm together with the support section, and displacing at least the leading end portion side of the wiper arm in the up-and-down direction with respect to the wiping surface. This thereby enables, for example, the configuration of the wiper arm to be simplified.

The wiper device of a fifth aspect of the present disclosure is the third aspect, wherein the wiper arm includes a fixed section fixed to the support section, and a movable section including the leading end portion and supported such that the leading end portion is capable of pivoting with respect to the fixed section about a hinge shaft running in a movement direction of the wiper arm. In the fifth aspect the actuator is an arm actuator configured to pivot the movable section with respect to the fixed section.

According to the wiper device of the fifth aspect, the wiper arm includes the fixed section fixed to the support section, and the movable section is supported such that the leading end portion of the wiper arm is capable of pivoting with respect to the fixed section about a hinge shaft running in the movement direction of the wiper arm. The movable section includes the leading end portion of the wiper arm to which the wiper blade is coupled. During back and forth movement of the wiper arm, the arm actuator pivots the movable section about the hinge shaft with respect to the fixed section. Due to adopting such a configuration in which the leading end portion of the movable section of the wiper arm is driven so as to be pivoted about the hinge shaft with respect to the fixed section, the actuator can, for example, be made more compact than a configuration in which the support section itself is displaced with respect to the vehicle.

A wiper device of a sixth aspect of the present disclosure is the fifth aspect, wherein the arm actuator is supported by the fixed section.

In the wiper device of the sixth aspect, the arm actuator is supported by the fixed section of the wiper arm, and so a more lightweight configuration can be achieved on the movable section side (leading end portion side of the wiper arm) than in a configuration in which the arm actuator is supported by the movable section of the wiper arm. As a result, there is less susceptibility to the effects of inertia when the wiper arm is being moved back and forth.

A wiper device of a seventh aspect of the present disclosure is the third aspect, wherein the control section includes at least one sensor selected from the group consisting of a position-finding sensor configured to detect a position of the wiper arm relative to the vehicle, a load sensor configured to detect load applied to the leading end portion, and a distance sensor configured to detect the distance between the leading end portion and the wiping surface. In the seventh aspect the control section is also configured to control actuation of the actuator based on a detection result from the at least one sensor.

According to the wiper device of the seventh aspect, the control section controls actuation of the actuator based on a detection result from the at least one sensor selected from the group consisting of the position-finding sensor, the load sensor, and the distance sensor. This thereby enables at least the leading end portion side of the wiper arm to be displaced with high precision in the up-and-down direction with respect to the wiping surface according to at least one factor out of the position of the wiper arm relative to the vehicle, the load applied to the leading end portion of the wiper arm, or the distance between the leading end portion of the wiper arm and the wiping surface.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
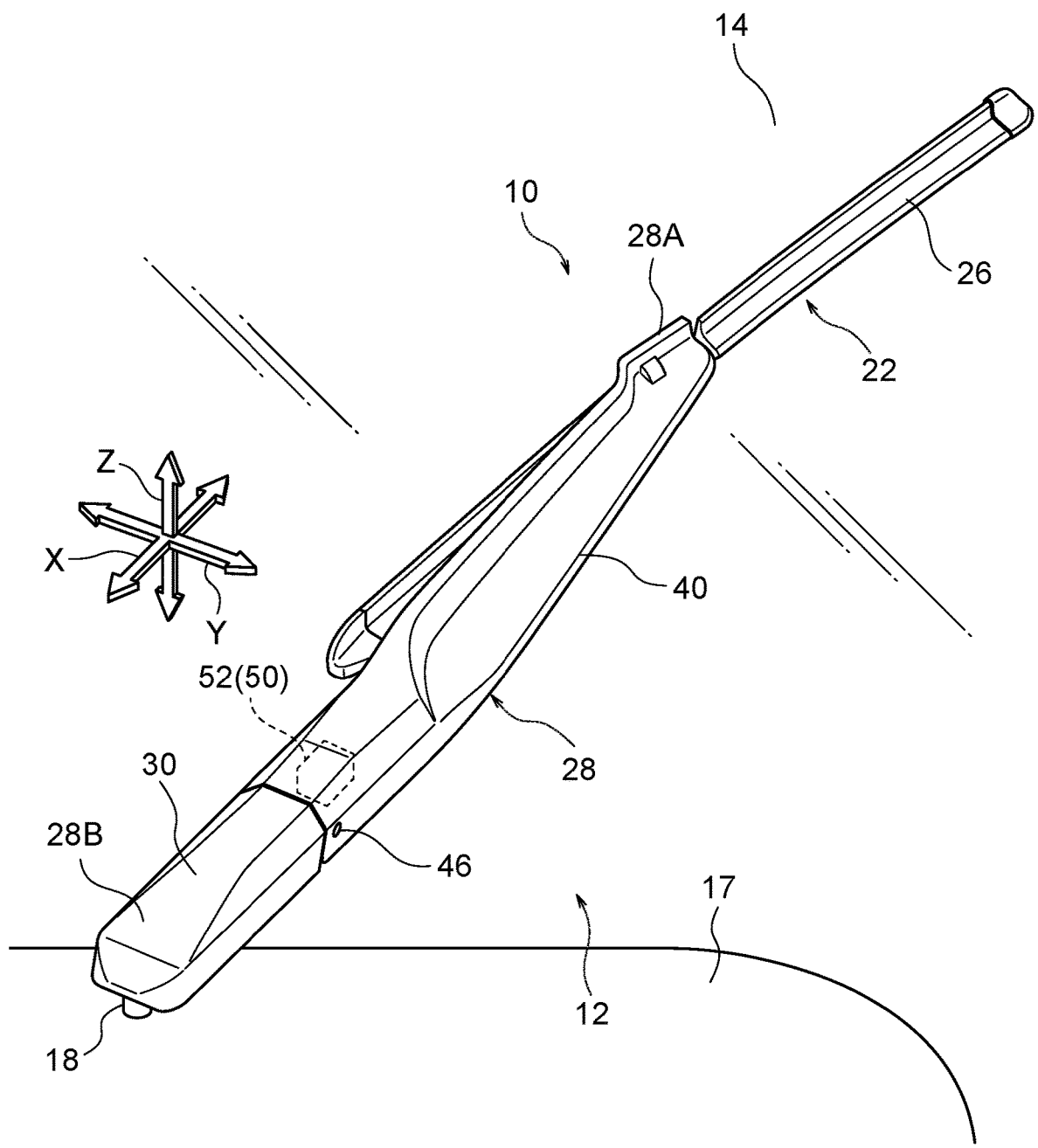
FIG. 1 is a perspective view illustrating a wiper device according to a first exemplary embodiment of the present disclosure.
Figure 2:
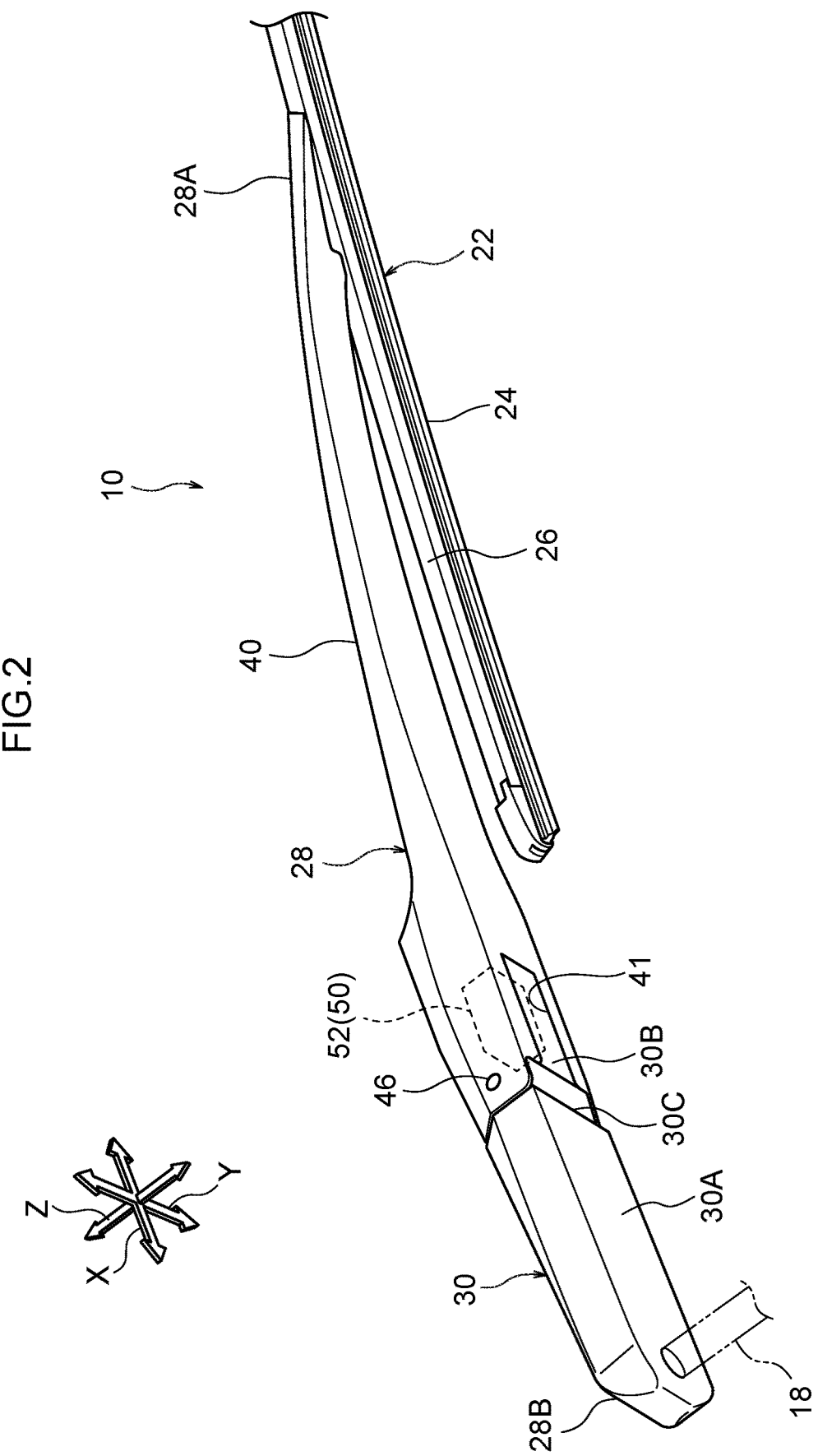
FIG. 2 is a perspective view illustrating the same wiper device, viewed from a different angle to in FIG. 1.
Figure 3:
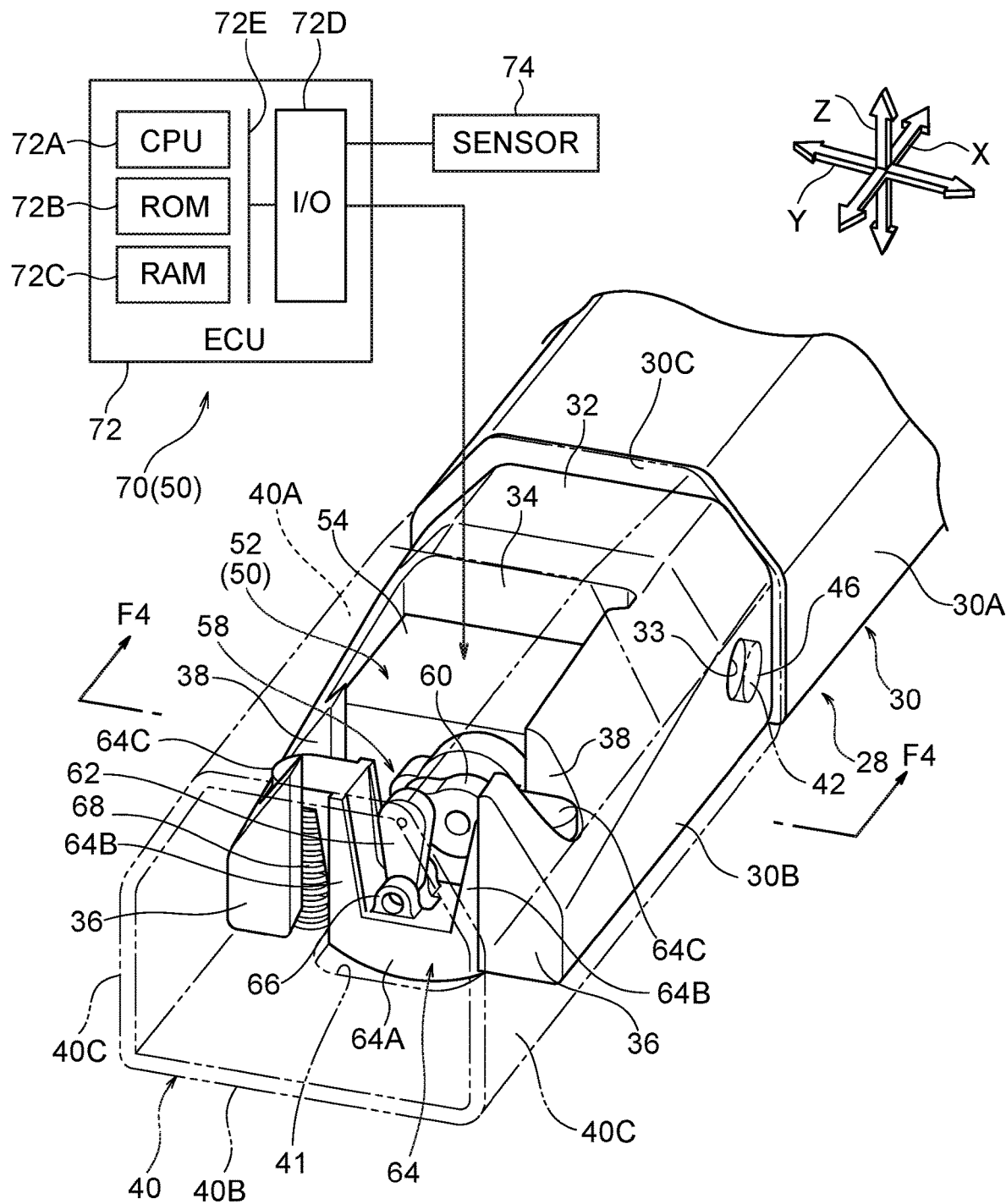
FIG. 3 is a perspective view illustrating configuration in the vicinity of a coupling portion between an arm head and a retainer in a wiper arm of the same wiper device.
Figure 4:
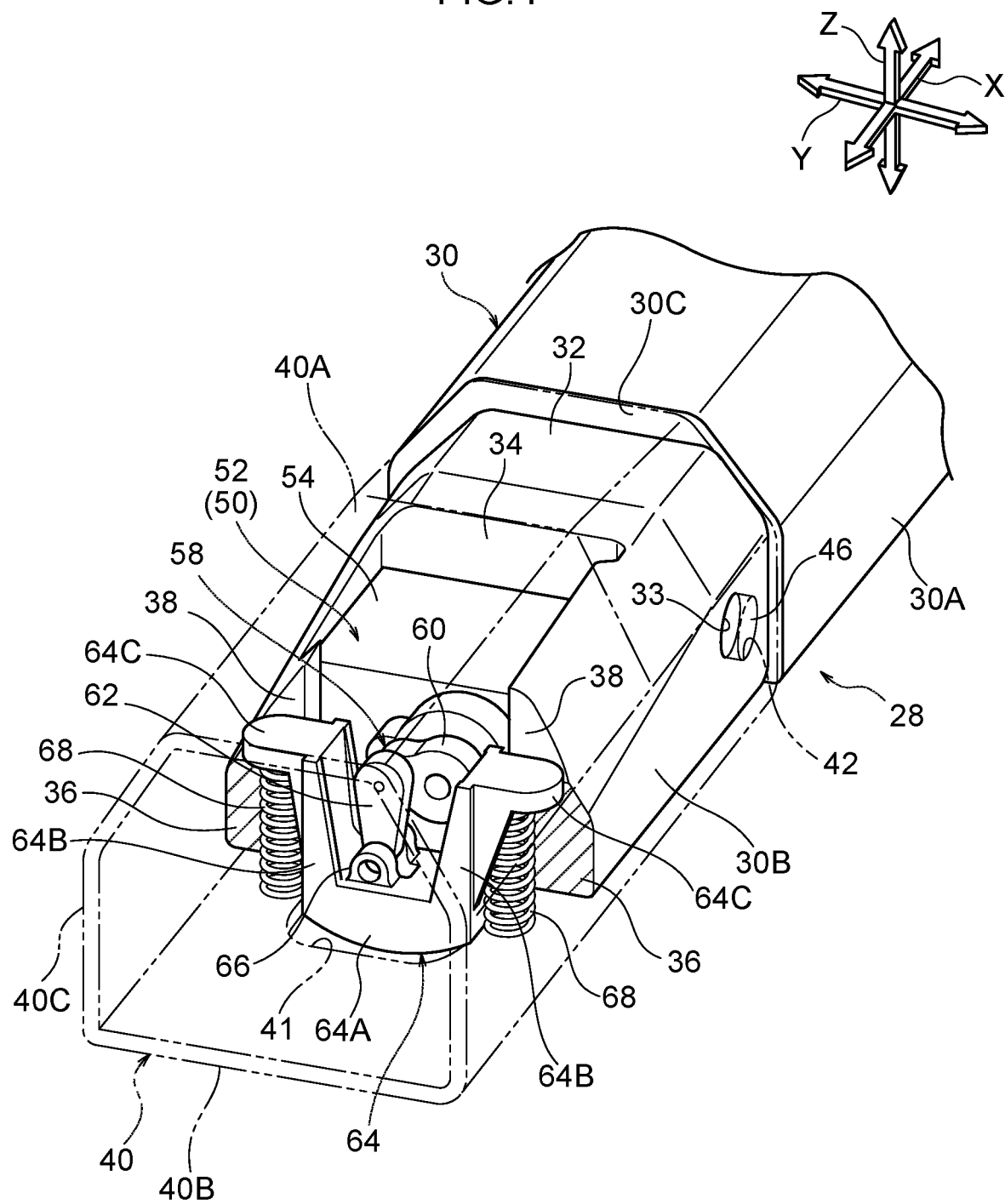
FIG. 4 is a perspective view illustrating the configuration illustrated in FIG. 3, with a part thereof cross-sectioned along line F4-F4 in FIG. 3.
Figure 5:
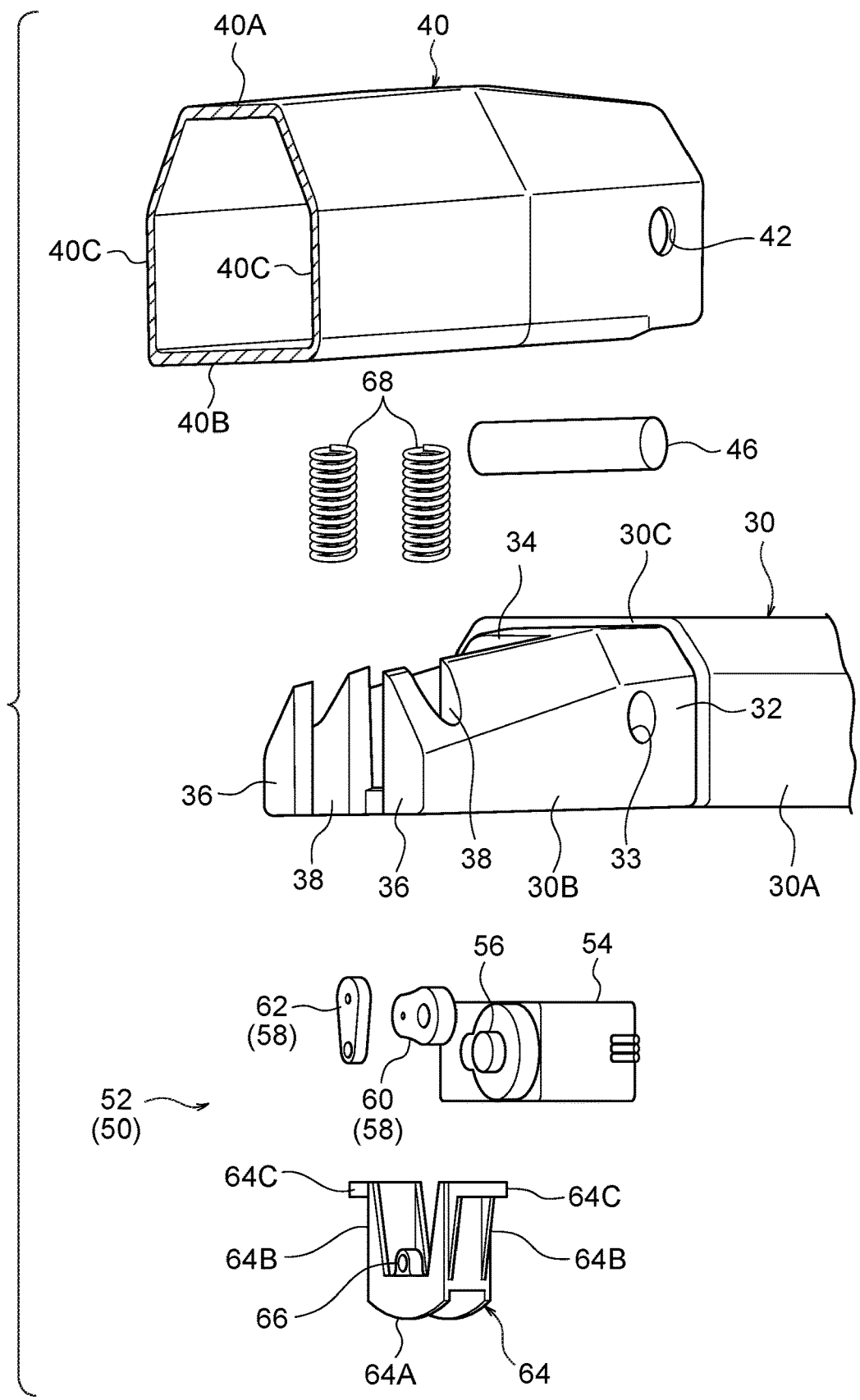
FIG. 5 is an exploded perspective view of the configuration illustrated in FIG. 3 exploded.

Explanation follows regarding a wiper device 10 according to a first exemplary embodiment of the present disclosure, with reference to FIG. 1 to FIG. 9. Note that in the drawings, some reference numerals may be omitted in the interests of simplicity. Dimensions in the drawings have been altered as appropriate for ease of explanation.

Configuration

As illustrated in FIG. 1, a wiper device 10 according to a first exemplary embodiment of the present disclosure is a vehicle wiper device of a vehicle such as an automobile, for wiping raindrops and the like adhered to a wiping surface 14 configured by an outer surface of a windshield 12 (not illustrated in the drawings, with the exception of FIG. 1). The wiping surface 14 is configured to curve greatly along a vehicle width direction and a vehicle front-rear direction (a configuration in which portions on both vehicle width direction sides are greatly curved in FIG. 1).

As illustrated in FIG. 1 to FIG. 5, the wiper device 10 includes a wiper arm 28, a wiper blade 22, a drive section 50, and a pair of compression coil springs 68. The wiper arm 28 is configured to pivot back and forth (move back and forth) about a support shaft 18, serving as a support section provided to a vehicle. The wiper blade 22 is coupled to a leading end portion of the wiper arm 28, and is configured to wipe the wiping surface 14. During the back and forth pivoting of the wiper arm 28, the drive section 50 is configured to displace at least a leading end portion 28A side of the wiper arm 28 in a direction orthogonal to the wiping surface 14 (i.e. a direction perpendicular to the wiping surface 14; an up-and-down direction with respect to the wiping surface 14) irrespective of force received by the wiper blade 22 from the wiping surface 14. The pair of compression coil springs 68 serve as an urging section configured to urge the wiper blade 22 toward the wiping surface 14. The drive section 50 is configured by an arm actuator 52 supported by (mounted to) the wiper arm 28, and a control section 70 (not illustrated in the drawings, with the exception of in FIG. 3) to control actuation of the arm actuator 52.

Note that it is sufficient as long as the wiper device 10 according to the present exemplary embodiment includes at least the wiper arm 28 from out of the wiper blade 22 and the wiper arm 28. Namely, the wiper blade 22 and the wiper device 10 may be considered as separate configuration elements. Moreover, it is sufficient as long as the drive section 50 includes at least the arm actuator 52 from out of the arm actuator 52 and the control section 70. Namely, the control section 70 and the drive section 50 may be considered as separate configuration elements, and the control section 70 may be disposed on a vehicle-side instead of being disposed on the wiper arm 28. In other words, the present exemplary embodiment may be interpreted as an exemplary embodiment disclosing the wiper arm 28 mounted with the arm actuator 52 as the drive section 50. Moreover, although the windshield 12 is a front windshield, there is no limitation thereto.

The wiper blade 22 is what is referred to as a flat type wiper blade, and includes a blade rubber 24 formed, for example, from rubber in an elongated shape, a rubber holder 26 the blade rubber 24 is attached to, and non-illustrated backing housed in the rubber holder 26 and urging both length direction end sides of the blade rubber 24 toward the windshield 12. The rubber holder 26 is, for example, formed from a soft resin material in an elongated shape, and the backing is, for example, formed from a metal material such as spring steel in an elongated shape. Note that the wiper blade of the present disclosure may be configured with a tournament structure in which plural levers are coupled together in a tournament pattern.

The wiper arm 28 is supported by (fixed to) the support shaft 18 provided to a front cowl section 17 (not illustrated in the drawings, with the exception of in FIG. 1) of the vehicle, and includes an arm head 30, serving as a fixed section capable of pivoting about the support shaft 18 with respect to the vehicle, and a retainer 40, serving as a movable section coupled to the arm head 30 so as to be capable of pivoting about a hinge shaft 46. The wiper arm 28 is formed in an elongated shape overall. The arm head 30 and the retainer 40 are formed from a metal material or a resin material, or from a resin material with a metal material embedded therein. Note that in the drawings, the arrows X, Y, and Z respectively indicate a length direction, a width direction, and a pivot axis direction of the wiper arm 28, as appropriate.

The arm head 30 configures a base end side location of the wiper arm 28, and is formed in an elongated, substantially rectangular block shape with its length in a length direction X of the wiper arm 28. The support shaft 18 is fixed to a length direction one end portion of the arm head 30 configuring a base end portion 28B of the wiper arm 28. The support shaft 18 is disposed with its axial direction in a pivot axis direction Z of the wiper arm 28, i.e. in a direction orthogonal to the length direction X of the wiper arm 28 and to a width direction Y thereof.

The support shaft 18 described above configures a pivot shaft, and is rotatably supported by a non-illustrated pivot holder provided within the front cowl section 17. The support shaft 18 projects upwards from the front cowl section 17 of the vehicle, and a length direction one end portion of the arm head 30 is fixed to this projecting portion. Rotation force from a non-illustrated wiper motor is transmitted to the support shaft 18 through a non-illustrated link mechanism, and the support shaft 18 is rotated back and forth thereby. The wiper arm 28 is thus configured to pivot back and forth about the support shaft 18. Note that the support shaft 18 may be configured so as to be rotationally driven directly by a wiper motor, without the use of a link mechanism, or may be configured to be pivoted back and forth about the support shaft 18 by a separate drive device.

A stepped portion 30C with a step-shaped profile is formed at the length direction other end side of the arm head 30. A location of the arm head 30 on the length direction one end side (support shaft 18 side) of the stepped portion 30C configures a head body 30A that has a substantially rectangular block shape with its length along the length direction X of the wiper arm 28. A location of the arm head 30 on the length direction other end side of the stepped portion 30C configures a retainer insertion portion 30B that has smaller dimensions than the head body 30A in the width direction Y and the pivot axis direction Z. The retainer insertion portion 30B is formed with a pivot axis direction Z dimension that becomes smaller on progression toward a leading end portion (a portion on the opposite side to the head body 30A).

The retainer insertion portion 30B has a substantially rectangular block shape with a length direction in the length direction X of the wiper arm 28. A length direction one end portion of the retainer insertion portion 30B (a base end portion; an end portion close to the head body 30A) of the retainer insertion portion 30B configures a retainer coupling portion 32. A length direction intermediate portion of the retainer insertion portion 30B is formed with a motor housing chamber 34 opening toward the opposite side to the wiping surface 14. The length direction other end portion of the retainer insertion portion 30B (a leading end portion; an end portion on the opposite side to the head body 30A) is formed with a pair of spring holders 36 that oppose each other across a space in the width direction Y of the wiper arm 28. Each of the pair of spring holders 36 is formed with a spring housing groove (spring housing chamber) 38 opening toward the width direction Y central portion of the wiper arm 28 and opening toward both sides in the pivot axis direction Z. Each of the spring housing grooves 38 has a substantially semicircular shaped profile opening toward the width direction Y center as viewed along the pivot axis direction Z.

The retainer 40 configures locations at a leading end side and locations at an intermediate portion of the wiper arm 28, and has an elongated, substantially rectangular tube shape with its length along the length direction X of the wiper arm 28. The retainer 40 includes an upper wall 40A and a lower wall 40B that oppose each other along the pivot axis direction Z of the wiper arm 28, and a pair of sidewalls 40C that oppose each other along the width direction Y of the wiper arm 28. The lower wall 40B is formed with a notch 41 notched into the base end portion 28B-side of the wiper arm 28. The retainer insertion portion 30B of the arm head 30 is inserted inside a length direction one end portion of the retainer 40.

Hinge holes 33, 42 are respectively formed in the retainer coupling portion 32 of the retainer insertion portion 30B and the pair of sidewalls 40C of the retainer 40. A hinge shaft 46 with an axial direction along the width direction Y of the wiper arm 28 is inserted into the hinge holes 33, 42. Axial direction displacement of the hinge shaft 46 with respect to the retainer 40 is restricted, and the retainer 40 is coupled to the arm head 30 so as to be capable of pivoting about the hinge shaft 46 (about an axial direction running in the width direction Y of the wiper arm 28). The length direction other end portion of the retainer 40 (the end portion on the opposite side to the arm head 30) configures the leading end portion 28A of the wiper arm 28. A length direction intermediate portion of the wiper blade 22 is coupled to the leading end portion 28A.

In the wiper arm 28 configured as described above, the arm actuator 52 of the drive section 50 is supported by (attached to) the retainer insertion portion 30B of the arm head 30. Note that in FIG. 1 and FIG. 2, the arm actuator 52 is illustrated simplified. The arm actuator 52 includes a servo motor 54 serving as a drive source, a link mechanism 58, and a follower member 64. The arm actuator 52 is housed together with the retainer insertion portion 30B within the length direction one end portion of the retainer 40. The servo motor 54 has a rectangular block shape, and is fixed to the arm head 30 in a state fitted inside the motor housing chamber 34. The servo motor 54 includes an output shaft 56 (see FIG. 5) projecting toward the leading end portion 28A of the wiper arm 28. The output shaft 56 is disposed with its axial direction along the length direction X of the wiper arm 28, and is aligned with the link mechanism 58.

The link mechanism 58 includes a first link member 60 having one end portion fixed to the output shaft 56, and a second link member 62 with one end portion coupled to another end portion of the first link member 60. The first link member 60 and the second link member 62 are each formed from a metal material or a resin material. The one end portion of the second link member 62 is coupled to a portion at the other end of the first link member 60 so as to be capable of rotating about a non-illustrated shaft having an axial direction in the length direction X of the wiper arm 28. The follower member 64 is coupled to a portion at the other end of the second link member 62.

The follower member 64 is formed from a metal material or a resin material, and is disposed on the leading end portion 28A-side of the wiper arm 28 (on the opposite side to the arm head 30) with respect to the servo motor 54. The follower member 64 includes a link coupling portion 64A extending in the width direction Y of the wiper arm 28, a pair of arm portions 64B extending from both length direction end portions of the link coupling portion 64A toward the upper wall 40A of the retainer 40 (toward the opposite side to the wiping surface 14), and a pair of spring restraint portions 64C extending from leading end portions (upper end portions) of the pair of arm portions 64B toward opposite sides to each other in the width direction Y. The follower member 64 has a substantially U-shaped profile as viewed along the length direction X of the wiper arm 28.

The link coupling portion 64A is disposed between the pair of spring holders 36 at the lower wall 40B side of the retainer 40. An upper face of the link coupling portion 64A is formed with a pair of shaft bearing portions 66 in a row along the length direction X of the wiper arm 28, and the other end portion of the second link member 62 is inserted between the pair of shaft bearing portions 66. The pair of shaft bearing portions 66 are each formed in a ring shape so as to have an axial direction along the length direction X. A non-illustrated shaft runs through the shaft bearing portions 66 and another end portion of the link coupling portion 64A. The second link member 62 is thus coupled to the link coupling portion 64A so as to be capable of pivoting about this shaft (about an axis extending in the length direction X).

The pair of arm portions 64B are disposed between the pair of spring holders 36, and extend in the pivot axis direction Z so as to run along the pair of spring housing grooves 38. The pair of spring restraint portions 64C extending from leading end portions (upper end portions, i.e. end portions on the opposite side to the link coupling portion 64A) of the pair of arm portions 64B are disposed on the upper wall 40A side within the retainer 40 so as to be capable of abutting an inner face of the upper wall 40A, and are inserted into the pair of spring housing grooves 38. The respective compression coil springs 68 are disposed between the pair of spring restraint portions 64C and the lower wall 40B of the retainer 40. The compression coil springs 68 are inserted into the pair of spring housing grooves 38. Axial direction displacement of the compression coil springs 68 is limited by the pair of spring restraint portions 64C and the lower wall 40B of the retainer 40, and radial direction displacement of the compression coil springs 68 is limited by the pair of spring holders 36 and the pair of arm portions 64B.

Portions at one axial direction end (upper end portions) of the pair of compression coil springs 68 are respectively supported by the pair of spring restraint portions 64C of the follower member 64. Portions at the other axial direction end (lower end portions) of the pair of compression coil springs 68 are respectively fixed to and supported by the lower wall 40B of the retainer 40. The follower member 64 and the retainer 40 are thus coupled (joined) together through the pair of compression coil springs 68.

In the arm actuator 52, when the output shaft 56 of the servo motor 54 rotates in a forward direction, the forward direction rotational force thereof is transmitted to the follower member 64 through the link mechanism 58, and the follower member 64 is displaced toward the opposite side to the wiping surface 14 with respect to the arm head 30 (toward the upper wall 40A of the retainer 40). The pair of spring restraint portions 64C accordingly abut the inner face of the upper wall 40A of the retainer 40. Thus a configuration is achieved such that the retainer 40, coupled to the follower member 64 through the pair of compression coil springs 68, pivots toward one side about the hinge shaft 46 (toward the opposite side to the wiping surface 14). When the output shaft 56 of the servo motor 54 rotates in a reverse direction, the reverse direction rotational force thereof is transmitted to the follower member 64 through the link mechanism 58, and the follower member 64 is displaced toward the wiping surface 14 with respect to the arm head 30 (toward the lower wall 40B of the retainer 40). Thus a configuration is achieved such that the retainer 40 coupled to the follower member 64 through the pair of compression coil springs 68 accordingly pivots toward the other side about the hinge shaft 46 (toward the wiping surface 14).

In this manner, in the wiper device 10 according to the present exemplary embodiment, actuation of the arm actuator 52 enables the retainer 40 (namely, the leading end portion 28A-side and intermediate side of the wiper arm 28) to be displaced in the direction orthogonal to the wiping surface 14, enabling the orientation (depression angle) of the retainer 40 to be freely modified (self-controlled). Changes to the orientation of the retainer 40 can accordingly be executed using only the drive force from the arm actuator 52, irrespective of force (reaction force) the wiper blade 22 receives from the wiping surface 14 during back and forth movement of the wiper arm 28. In other words, during the back and forth movement of the wiper arm 28, driving for displacement in the direction orthogonal to the wiping surface 14 is performed by the arm actuator 52 so as to maintain a uniform distance between the leading end portion 28A of the wiper arm 28 and the wiping surface 14, irrespective of the wiper blade 22 (even in a detached state of the wiper blade 22).

An electronic control unit (ECU) 72 (not illustrated in the drawings, with the exception of in FIG. 3), this being a configuration element of the control section 70, is electrically connected to the servo motor 54 of the arm actuator 52 described above. The ECU 72 includes a central processing unit (CPU) 72A, read only memory (ROM) 72B, random access memory (RAM) 72C, and an input/output interface (I/O) 72D configured to communicate with an external device. These components are connected together through a bus 72E. The CPU 72A reads a program from the ROM 72B, and executes the program, using the RAM 72C as a workspace. The ECU 72 is, for example, installed inside the vehicle. Note that the ECU 72 may be configured by plural electronic control units, and may be implemented by either hardware or software.

A sensor 74 (not illustrated in the drawings, with the exception of in FIG. 3), which is electrically connected to the wiper motor described above and is a configuration element of the control section 70, is electrically connected to the ECU 72. The sensor 74 includes at least one sensor out of a position-finding sensor that detects a position of the wiper arm 28 relative to the vehicle, a load sensor that detects load applied to the leading end portion 28A of the wiper arm 28, and a distance sensor that detects the distance between the leading end portion 28A of the wiper arm 28 and the wiping surface 14. The position-finding sensor is, for example, an angle sensor that detects a rotation position (rotation angle) of the support shaft 18 relative to the vehicle. The load sensor is, for example, a load cell attached to the leading end portion 28A of the wiper arm 28. The distance sensor is, for example, an infrared sensor or an ultrasound sensor attached to the leading end portion 28A of the wiper arm 28. During back and forth pivoting of the wiper arm 28, the ECU 72 controls actuation of the arm actuator 52 based on a detection result of the sensor 74 so as to adopt a configuration in which a uniform distance is maintained between the leading end portion 28A of the wiper arm 28 and the wiping surface 14.

Operation and Advantageous Effects

Explanation follows regarding operation and advantageous effects of the present exemplary embodiment.

In the wiper device 10 configured as described above, the wiper arm 28 moves back and forth with the base end portion 28B supported by the support shaft 18 provided to the front cowl section 17 of the vehicle. The wiper blade 22 coupled to the leading end portion 28A of the wiper arm 28 accordingly wipes back and forth across the wiping surface 14 of the vehicle. During back and forth pivoting of the wiper arm 28, the drive section 50 is capable of displacing the retainer 40 of the wiper arm 28 in the direction orthogonal to the wiping surface 14 irrespective of force the wiper blade 22 receives from the wiping surface 14. This enables the leading end portion 28A of the wiper arm 28 (retainer 40) to maintain a uniform distance from the wiping surface 14 in response to changes in the profile of the wiping surface 14, even in the presence of changes in the profile of the wiping surface 14 having a large curvature in the vehicle width direction and the vehicle front-rear direction or external factors such as travel-induced airflow.

Moreover, since the orientation of the retainer 40 always follows changes in the profile of the wiping surface 14, the contact pressure of the wiper blade 22 coupled to the retainer 40 against the wiping surface 14 can be independently set from the ability of the retainer 40 to follow the wiping surface 14. Namely, in the present exemplary embodiment, the contact pressure and the control of the orientation (depression angle) of the retainer 40 can be set separately to each other. As a result, this enables an appropriate contact pressure to be stably imparted to the wiping surface 14 without, for example, imparting an unnecessary large spring load.

The wiper device 10 according to the present exemplary embodiment includes the pair of compression coil springs 68 that urge the wiper blade 22 toward the wiping surface 14. Accordingly, during back and forth movement of the wiper arm 28, the wiper blade 22 is urged toward the wiping surface 14 by the pair of compression coil springs 68 in a configuration in which the drive section 50 is used to displace the retainer 40 in the direction orthogonal to the wiping surface 14. This enables the wiper blade 22 to be contacted against the wiping surface 14 using a uniform and comparatively light urging force independently from the ability of the retainer 40 to follow the wiping surface 14. Moreover, the method used to apply load to the wiper blade 22 is not limited to a traditional method (for example to a method in which a tension coil spring is spanned between the arm head 30 and the retainer 40), thus increasing the degrees of freedom for the load application method.

Figure 6:
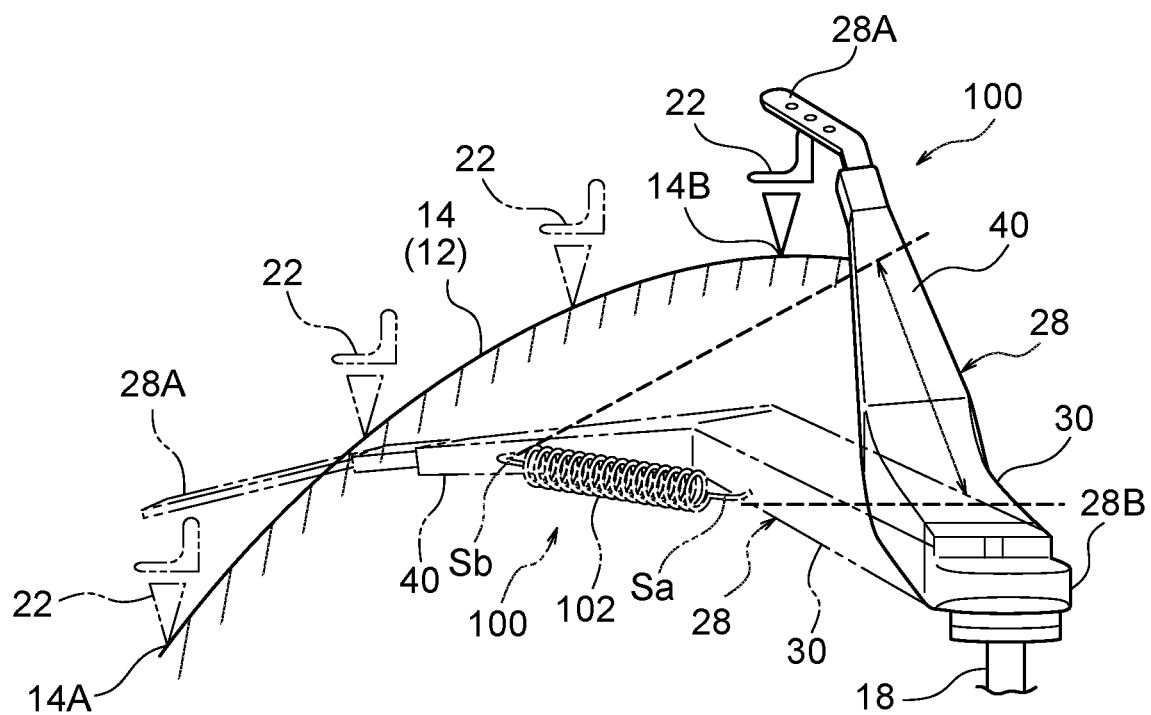
FIG. 6 is a schematic diagram to explain a relationship between changes in profile of a wiping surface and changes in orientation of a retainer in a related wiper device.
Figure 7:
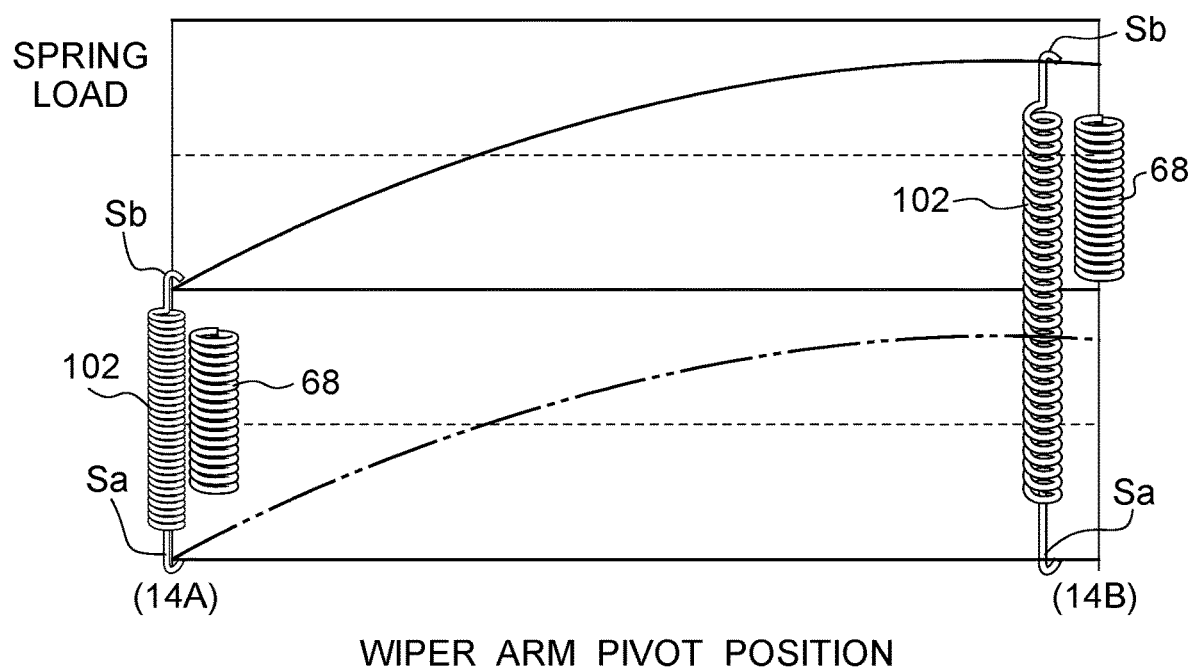
FIG. 7 is a schematic diagram to explain a relationship between changes in profile of a wiping surface and spring load.
Figure 8:
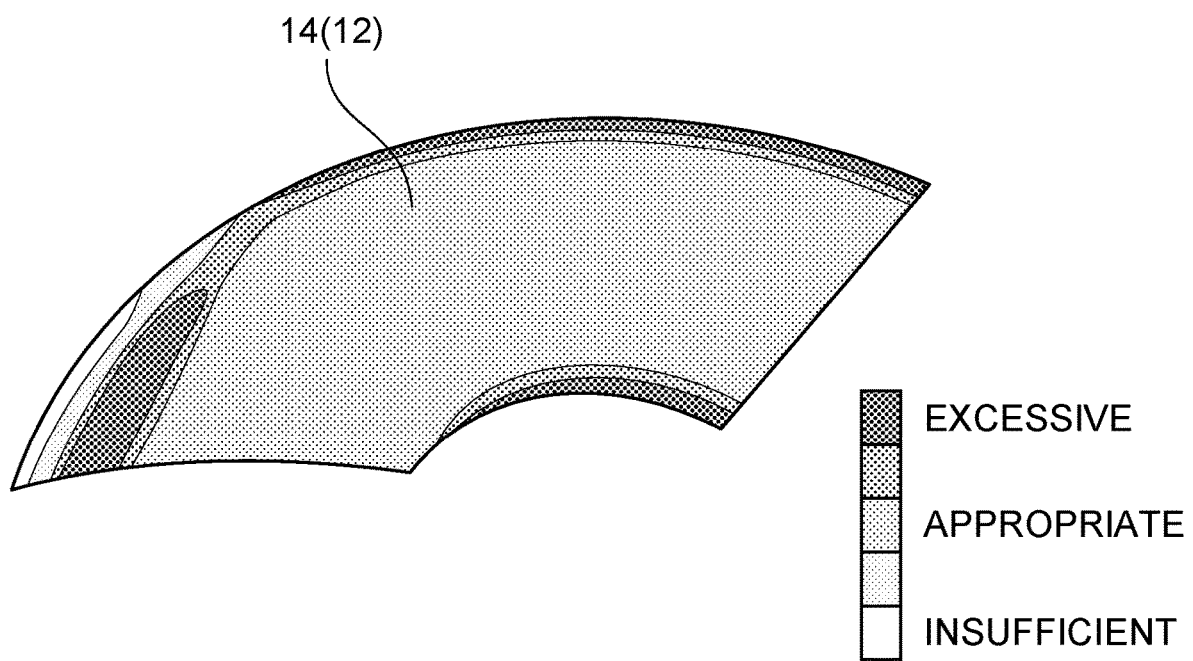
FIG. 8 is an analysis diagram illustrating an example of a contact pressure distribution of a blade rubber in a related wiper device.
Figure 9:
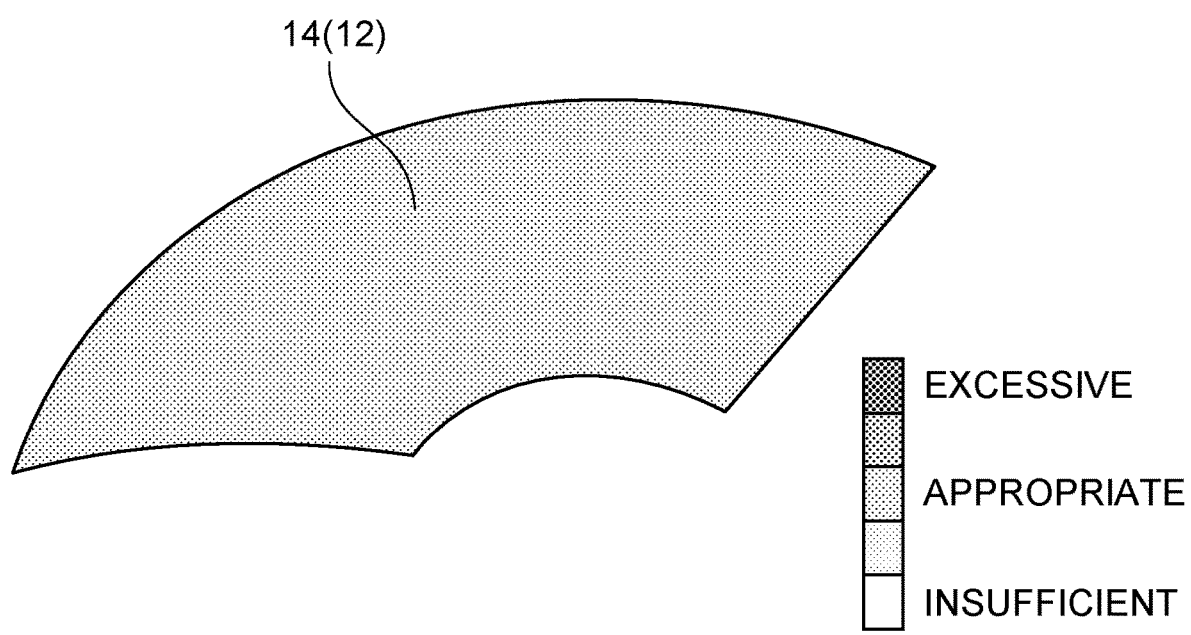
FIG. 9 is an analysis diagram illustrating an example of a contact pressure distribution of a blade rubber in a wiper device according to an exemplary embodiment of the present disclosure.

Further explanation follows regarding the above advantageous effects, with reference to FIG. 6 to FIG. 9. FIG. 6 is a schematic diagram illustrating a relationship between the change in profile of the wiping surface 14 and the change in orientation of the retainer 40 in a related wiper device 100. FIG. 7 is a schematic diagram illustrating a relationship between the change in profile of the wiping surface 14 and spring load. FIG. 8 is an analysis diagram illustrating an example of a contact pressure distribution of a blade rubber in the related wiper device 100. FIG. 9 is an analysis diagram illustrating an example of a contact pressure distribution of the wiper blade 22 in the wiper device 10 according to the present exemplary embodiment. Note that in FIG. 6 and FIG. 7, the same reference numerals to those of the present exemplary embodiment are allocated to similar configuration to that of the present exemplary embodiment. In FIG. 8 and FIG. 9, the dot density at a given location increases the higher the contact pressure of the wiper blade 22 is thereat.

In the related wiper device 100 illustrated in FIG. 6, a tension coil spring 102 is spanned across between the arm head 30 and the retainer 40. In the wiper device 100, the tension of the tension coil spring 102 is set such that the wiper blade 22 will follow and be pressed against the wiping surface 14 even at a location 14A where the wiping surface 14 is lowest in the axial direction of the support shaft 18 (namely, a pivot position of the wiper arm 28 where the distance between anchor points (Sa, Sb) of the tension coil spring 102 is shortest; see the wiper arm 28 illustrated by double-dotted dashed lines in FIG. 6). Accordingly, as illustrated in FIG. 7, at a location 14B where the wiping surface 14 is highest in the axial direction of the support shaft 18, the tension coil spring 102 is stretched, resulting in an unnecessarily large (excessive) load being applied to the wiper arm 28 and the wiper blade 22. As a result, as illustrated in FIG. 8, it is no longer possible to stably impart an appropriate (even) contact pressure to the wiping surface 14.

By contrast, in the present exemplary embodiment, during back and forth pivoting of the wiper arm 28, the retainer 40 is displaced in the direction orthogonal to the wiping surface 14 by actuation of the arm actuator 52 of the drive section 50, thereby maintaining a uniform distance between the leading end portion 28A of the wiper arm 28 and the wiping surface 14. Accordingly, as schematically illustrated in FIG. 7, the compression coil springs 68 are maintained at a uniform length, thereby enabling the application of unnecessarily large load to the wiper arm 28 and the wiper blade 22 to be prevented. As a result, as illustrated in FIG. 9, an appropriate contact pressure can be stably imparted to the wiping surface 14.

In the present exemplary embodiment, during the back and forth pivoting of the wiper arm 28, the control section 70 controls actuation of the arm actuator 52 such that the arm actuator 52 displaces (pivots) the retainer 40 in the direction orthogonal to the wiping surface 14. Accordingly, a uniform distance is maintained between the leading end portion 28A of the wiper arm 28 and the wiping surface 14. Due to adopting the configuration in which a uniform distance is maintained between the leading end portion 28A of the wiper arm 28 and the wiping surface 14 by controlling actuation of the arm actuator 52, the wiper arm 28 following is configured so as to be responsive to circumstances by inputting control signals, thus enabling an even more stable and appropriate contact pressure to be achieved for the contact pressure of the wiper blade 22.

For example, a configuration may be adopted in which various sensors configured to detect a state of the wiping surface 14, the strength of the travel-induced airflow, the temperature in the vehicle surroundings, and the like are electrically connected to the ECU 72 of the control section 70, and actuation of the arm actuator 52 is controlled based on the detection results of these sensors. This enables the retainer 40 to be driven at an optimal position at all times, even when external factors in the vehicle surroundings fluctuate, thereby enabling fluctuations in the contact pressure of the wiper blade 22 to be effectively suppressed.

Moreover, in the present exemplary embodiment, the wiper arm 28 includes the arm head 30 (fixed section) that is fixed to the support shaft 18, and the retainer 40 (movable section) supported such that the leading end portion 28A of the wiper arm 28 is capable of pivoting with respect to the arm head 30 about the hinge shaft 46 running along a pivoting direction of the wiper arm 28. The retainer 40 includes the leading end portion 28A of the wiper arm 28 to which the wiper blade 22 is coupled. During the back and forth pivoting of the wiper arm 28, the arm actuator 52 pivots the retainer 40 about the hinge shaft 46 with respect to the arm head 30 so as to maintain a uniform distance between the leading end portion 28A of the wiper arm 28 and the wiping surface 14. Since configuration is made to drive pivoting of the leading end portion 28A of the retainer 40 of the wiper arm 28 about the hinge shaft 46 with respect to the arm head 30, the actuator can, for example, be made more compact than in a configuration in which the support shaft 18 itself is displaced relative to the vehicle.

Moreover, in the present exemplary embodiment, the arm actuator 52 is supported by (attached to) the arm head 30, thus enabling a more lightweight configuration to be achieved on the retainer 40 side (the leading end portion 28A-side of the wiper arm 28) than in a configuration in which the arm actuator 52 is supported by the retainer 40. As a result, there is less susceptibility to the effects of inertia when the wiper arm 28 is being pivoted back and forth about the support shaft 18.

Moreover, in the present exemplary embodiment, the sensor 74 of the control section 70 includes at least one sensor out of a position-finding sensor that detects a position of the wiper arm 28 relative to the vehicle, a load sensor that detects load applied to the leading end portion 28A of the wiper arm 28, and a distance sensor that detects the distance between the leading end portion 28A of the wiper arm 28 and the wiping surface 14. The ECU 72 of the control section 70 controls actuation of the arm actuator 52 based on the detection results of the sensor 74. Accordingly, at least the leading end portion side of the wiper arm 28 can be displaced with high precision in the direction orthogonal to the wiping surface 14 in response to at least one factor out of the position of the wiper arm 28 relative to the vehicle, the load applied to the leading end portion 28A of the wiper arm 28, or the distance between the leading end portion 28A of the wiper arm 28 and the wiping surface 14.

Second Exemplary Embodiment

Explanation follows regarding a second exemplary embodiment of the present disclosure. Note that configurations and operation that are basically the same as in the first exemplary embodiment are allocated the same reference numerals to those of the first exemplary embodiment, and explanation thereof is omitted.

Figure 10:
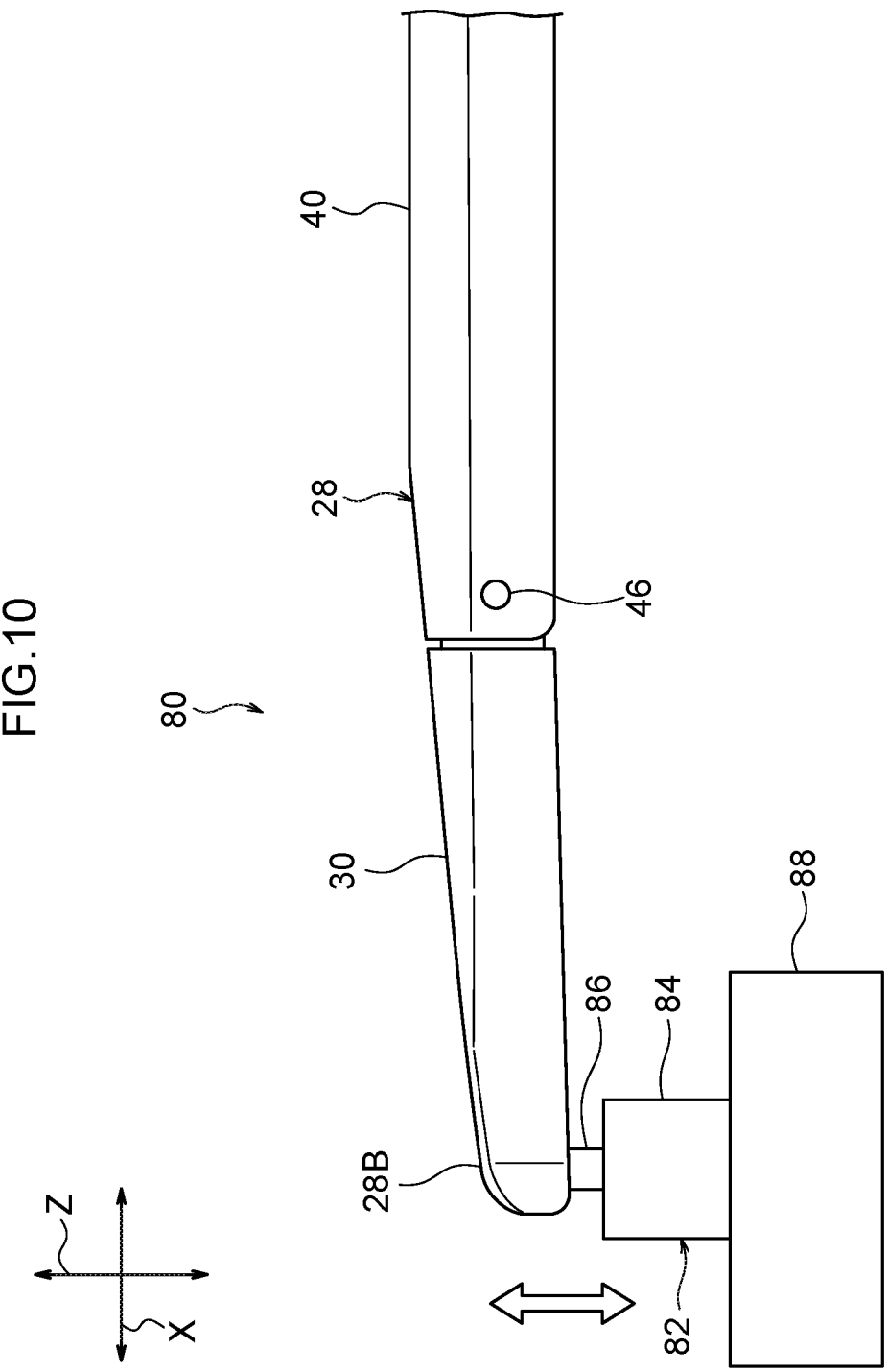
FIG. 10 is a side view illustrating a partial configuration of a wiper device according to a second exemplary embodiment of the present disclosure.

FIG. 10 is a side view illustrating a partial configuration of a wiper device 80 according to the second exemplary embodiment of the present disclosure. The wiper device 80 includes a support drive actuator 82 instead of the arm actuator 52 according to the first exemplary embodiment. The support drive actuator 82 is, for example, a linear stepping motor, and is capable of displacing a circular column shaped shaft 86 along its axial direction with respect to a housing 84. The shaft 86 corresponds to a "support shaft" of the present disclosure, and a leading end portion of the shaft 86 is fixed to the base end portion 28B of the wiper arm 28. The housing 84 is fixed to an output shaft (not illustrated in the drawings) of a wiper motor 88 that is fixed to the front cowl section 17 of the vehicle. The wiper motor 88 is configured with capabilities to pivot the support drive actuator 82 and the wiper arm 28 back and forth about the axis of the shaft 86.

The ECU 72 and the sensor 74 (not illustrated in FIG. 10) are electrically connected to the support drive actuator 82 and the wiper motor 88 described above. During back and forth pivoting of the wiper arm 28, the ECU 72 controls actuation of the support drive actuator 82 based on detection results of the sensor 74 in a configuration such that a uniform distance is maintained between the leading end portion 28A of the wiper arm 28 and the wiping surface 14 (none of these are illustrated in FIG. 10).

In the present exemplary embodiment, the orientation of the wiper arm 28 follows the change in profile of the wiping surface 14, this enables the contact pressure against the wiping surface 14 of the wiper blade 22 (not illustrated in FIG. 10) coupled to the leading end portion 28A of the wiper arm 28 to be set independently of the ability of the wiper arm 28 to follow the wiping surface 14. As a result, for example, an appropriate contact pressure can be stably imparted to the wiping surface 14 without imparting an unnecessarily large spring load. Moreover, in the present exemplary embodiment, during back and forth pivoting of the wiper arm 28, the support drive actuator 82 displaces the shaft 86 (support shaft; support section) itself relative to the vehicle, thereby displacing the entire wiper arm 28 together with the shaft 86, such that the entire wiper arm 28 is displaced in the direction orthogonal to the wiping surface 14. This enables the configuration of the wiper arm 28 to be simplified in comparison to a configuration in which the arm actuator 52 is mounted on the wiper arm 28.

Supplementary Explanation of the Exemplary Embodiments

Although the wiper arm 28 is configured to pivot about the support shaft 18 in the exemplary embodiments described above, there is no limitation thereto. Namely, a base end portion of a wiper arm of the present disclosure may be supported so as to be slidable relative to the vehicle. In such cases, the base end portion of the wiper arm is not limited to sliding in a straight line, and may be configured so as to slide in a circular arc shape (curving shape).

Although in each of the exemplary embodiments described above configurations are adopted in which installation is made to the front cowl section 17 or its surroundings, there is no limitation thereto, and the configurations may be arranged at any position close to the windshield glass, such as a location on a vehicle ceiling, pillar, or the like.

Moreover, although a configuration is adopted in the first exemplary embodiment in which the arm actuator 52 is supported by the arm head 30 (fixed section) of the wiper arm 28, the present disclosure is not limited thereto, and a configuration may be adopted in which the arm actuator 52 is supported by the retainer 40.

Moreover, although a configuration is adopted in the first exemplary embodiment in which the compression coil springs 68 are employed to impart contact pressure of the wiper blade 22 to the wiping surface 14, there is no limitation thereto, and a tension spring spanning across between the arm head 30 and the retainer 40, as in a traditional configuration, may be employed to impart contact pressure of the wiper blade 22 to the wiping surface 14. In such cases, setting of the spring force of the tension spring may still be performed by setting independently to the ability of the wiper arm orientation to follow the wiping surface, thereby enabling an appropriate contact pressure to be stably imparted without imparting an unnecessarily large spring load.

Moreover, although in each of the exemplary embodiments described above the leading end portion 28A-side of the wiper arm 28 is maintained at a uniform distance from the wiping surface 14 so as to enable the profile change of the wiping surface to be followed at all times, the link mechanism 58 may be further configured such that the follower member 64 is capable of comparatively large displacement toward the opposite side to the wiping surface 14 so as to enable the wiper blade 22 to be maintained in a state separated from the wiping surface 14 by pivoting the retainer 40 toward the opposite side to the wiping surface 14. This enables issues such as deformation of the blade rubber of the wiper blade 22, or the blade rubber of the wiper blade 22 sticking to the windshield in cold areas when the wiper device is not used for extended periods, to be prevented from occurring.

Various other modifications may be implemented within a range not departing from the spirit of the present disclosure. Obviously, the scope of rights encompassed by the present disclosure is not limited by the respective exemplary embodiments.

What is claimed is:

1. A wiper device comprising:
   a wiper arm having a base end portion supported by a support section provided at a vehicle, and being configured such that a wiping surface of the vehicle is wiped back and forth by a wiper blade coupled to a leading end portion of the wiper arm; and
   a drive section configured to displace at least a leading end portion side of the wiper arm in an up-and-down direction with respect to the wiping surface during back and forth movement of the wiper arm, irrespective of force the wiper blade receives from the wiping surface, wherein:
   the drive section includes an actuator configured to displace at least the leading end portion side in the up-and-down direction with respect to the wiping surface;
   the wiper arm includes:
      a fixed section fixed to the support section; and
      a movable section including the leading end portion and supported such that the leading end portion is capable of pivoting with respect to the fixed section about a hinge shaft running in a movement direction of the wiper arm;
   the actuator is an arm actuator configured to pivot the movable section with respect to the fixed section; and a motor of the actuator is located more toward the leading end portion of the wiper arm than is the hinge shaft.

2. The wiper device of claim 1, further comprising an urging section configured to urge the wiper blade toward the wiping surface.

3. The wiper device of claim 2, wherein the urging section includes a compression coil spring.

4. The wiper device of claim 1, wherein the drive section includes
- a control section configured to control actuation of the actuator so as to maintain a uniform distance between the leading end portion and the wiping surface during back and forth movement of the wiper arm.

5. The wiper device of claim 4, wherein the actuator is a support drive actuator configured to displace the support section itself relative to the vehicle.

6. The wiper device of claim 5, wherein the support drive actuator includes a linear stepping motor.

7. The wiper device of claim 4, wherein the arm actuator is supported by the fixed section.

8. The wiper device of claim 4, wherein the control section:
- includes at least one sensor selected from the group consisting of a position-finding sensor configured to detect a position of the wiper arm relative to the vehicle, a load sensor configured to detect a load applied to the leading end portion, and a distance sensor configured to detect a distance between the leading end portion and the wiping surface; and
- is configured to control actuation of the actuator based on a detection result from the at least one sensor.

9. The wiper device of claim 8, wherein:
the position-finding sensor is an angle sensor that detects a rotation position of the support section;
the load sensor is a load cell attached to the leading end portion of the wiper arm; and
the distance sensor is an infrared sensor or an ultrasound sensor attached to the leading end portion of the wiper arm.

10. The wiper device of claim 4, wherein the motor of the actuator is a servo motor.

11. The wiper device of claim 1, wherein the wiper arm is configured to pivot back and forth about a support shaft, serving as the support section.

12. A wiper device comprising:
a wiper arm having a base end portion supported by a support section provided at a vehicle, and being configured such that a wiping surface of the vehicle is wiped back and forth by a wiper blade coupled to a leading end portion of the wiper arm; and
a drive section configured to displace at least a leading end portion side of the wiper arm in an up-and-down direction with respect to the wiping surface during back and forth movement of the wiper arm, irrespective of force the wiper blade receives from the wiping surface, wherein:
the drive section includes:
- an actuator configured to displace at least the leading end portion side in the up-and-down direction with respect to the wiping surface; and
- a control section configured to control actuation of the actuator so as to maintain a uniform distance between the leading end portion and the wiping surface during back and forth movement of the wiper arm; and
the actuator is a support drive actuator configured to displace the support section itself relative to the vehicle.

13. A wiper device comprising:
a wiper arm having a base end portion supported by a support section provided at a vehicle, and being configured such that a wiping surface of the vehicle is wiped back and forth by a wiper blade coupled to a leading end portion of the wiper arm; and
a drive section configured to displace at least a leading end portion side of the wiper arm in an up-and-down direction with respect to the wiping surface during back and forth movement of the wiper arm, irrespective of force the wiper blade receives from the wiping surface, wherein:
the drive section includes:
- an actuator configured to displace at least the leading end portion side in the up-and-down direction with respect to the wiping surface; and
- a control section configured to control actuation of the actuator so as to maintain a uniform distance between the leading end portion and the wiping surface during back and forth movement of the wiper arm;
the actuator is a support drive actuator configured to displace the support section itself relative to the vehicle; and
the support drive actuator includes a linear stepping motor.

* * * * *